Patented Aug. 11, 1953

2,648,655

UNITED STATES PATENT OFFICE 2,648,655

LOW-TEMPERATURE EMULSION POLYMERIZATION OF UNSATURATED ORGANIC COMPOUNDS

Edwin J. Vandenberg, Wilmington, Del., assignor to Hercules Powder Company, Wilmington, Del., a corporation of Delaware No Drawing. Application November 24, 1948, Serial No. 61,917

9 Claims. (Cl. 260—82.5)

This invention relates to an improved process for the polymerization of unsaturated compounds. More particularly, the invention relates to a process for emulsion polymerization of vinyl, vinylidene, and vinylene compounds at temperatures below 0° C.

It is well known that unsaturated compounds, and particularly those which contain the vinyl group may be advantageously polymerized in aqueous emulsion. Thus, synthetic, rubberlike materials have been prepared by the emulsion polymerization of diolefins and by the interpolymerization of diolefinic compounds with other unsaturates such as styrene, acrylic acid esters, acrylonitrile, and like materials. Likewise, such materials as polyvinyl halides, polyvinyl acetate, polystyrene, polymethyl methacrylate and various other addition polymers have been prepared by the emulsion polymerization technique.

The emulsion of polymerization of vinyl compounds has customarily been effected at relatively high temperatures. For example, a temperature of about 122° F. has been accepted as a standard for the commercial production of the butadiene-styrene copolymer-type synthetic rubbers. Conventional peroxide catalysts such as potassium persulfate or benzoyl peroxide, and fatty acid soap emulsifying agents such as potassium oleate have normally been employed in such polymerization processes. These prior art emulsion polymerization processes are, however, not as advantageous in some respects as are polymerizations carried out at lower temperatures. It is known, for example, that the synthetic rubber-like materials produced by emulsion polymerization at temperatures substantially below 122° F. are markedly superior in important physical characteristics such as tensile strength, elongation, flex life, resilience and resistance to accelerated aging to similar materials prepared within the conventional temperature ranges.

It has heretofore been deemed impractical, however, to produce synthetic rubberlike materials in commercial quantities by the low temperature emulsion polymerization of vinyl compounds. The utilization of such a low temperature process has previously resulted in a very substantial increase in the reaction time required to produce a desirable yield of polymeric materials. Even after extended periods of reaction, only relatively low yields of such polymeric materials were normally obtained. The discovery of a process whereby the advantages which attend the low temperature emulsion polymerization of vinyl compounds might be availed of, and a high quality rubber polymeric product obtained in good yield after a reasonable period of reaction has, therefore, constituted a major problem in the art.

Now in accordance with this invention it has been discovered that the polymerization of organic compounds containing the $CH_2=C<$ group may be effected at temperatures below about 0° C. in aqueous emulsion in the presence of a water-soluble organic compound of low freezing point as antifreeze agent, an $a,a$-dialkylarylmethyl hydroperoxide as catalyst, an alkali metal dehydrogenated rosin acid salt as emulsifying agent, and an electromotive couple having a standard oxidation-reduction potential between about $-1.0$ and about $-0.3$ volt.

The standard oxidation-reduction potential to which reference is made herein is the value in volts of the electrical potential of the couple in question determined at 25° C. under a pressure of one atmosphere with solutions of one molal activity referred to the potential of the hydrogen-hydrogen ion couple as zero. The sign of the oxidation-reduction potential value is negative when the reduced form of the couple is a weaker reducing agent than hydrogen.

One of the components of the activators of this invention may be a metallic reducing agent, and the term "metallic reducing agent" is utilized herein to designate all of those materials which contain metallic atoms and which are capable of acting as reducing agents, i. e., which are capable of donating an electron to other components of the reaction mixture. Thus, there is embraced by the term "metallic reducing agent" not only the free metallic ions such as the ferrous ion ($Fe^{++}$) but also complexes of such metallic ions such as the ferrous pyrophosphate complex. Likewise included are metallic compounds which are substantially completely insoluble but which nevertheless act as reducing agents such as, for example, nickel hydroxide ($Ni(OH)_2$) which forms the couple $$Ni(OH)_2 + 2OH^- \rightarrow NiO_2 + 2H_2O + 2e^-$$

the standard oxidation-reduction potential of which is $-0.5$ volt.

By the process of this invention there may be produced excellent yields of synthetic, rubberlike materials after relatively short periods of reaction. Furthermore, the rubber polymers so obtained are characterized by superior physical properties as compared with similar materials prepared in like manner at substantially higher temperatures or in the presence of conventional fatty acid soaps alone as emulsifying agents.

The following examples are illustrative of the production of polymers by emulsion polymerization at low temperatures in accordance with this invention. The $a,a$-dimethylbenzyl hydroperoxide catalyst employed in these examples was prepared by the air oxidation of cumene. It contained 70.0% $a,a$-dimethylbenzyl hydroperoxide, 17.0% $a,a$-dimethylbenzyl alcohol, and 13% acetophenone and other secondary reaction products. All parts are by weight unless otherwise indicated.

Example 1

Butadiene-1,3 and styrene were copolymerized in a glass container. The reaction mixture was formulated from the following ingredients in the proportions indicated.

| Ingredients: | Parts |
|---|---|
| Butadiene-1,3 | 72 |
| Styrene | 28 |
| Water | 150 |
| Methanol | 50 |
| $a,a$-Dimethylbenzyl hydroperoxide (catalyst) | 0.2 |
| Tertiary mercaptans [1] (modifier) | 0.2 |
| Potassium salt of dehydrogenated rosin (emulsifier) | 5.0 |
| $FeSO_4.7H_2O$ | 0.36 |
| $Na_4P_2O_7.10H_2O$ (activator) | 0.40 |

[1] Tertiary mercaptan blend composed of $C_{12}$, $C_{14}$ and $C_{16}$ tertiary mercaptans in the ratio of 3:1:1.

The ferrous pyrophosphate activator was prepared by adding dropwise and with vigorous agitation in an inert atmosphere 200 parts of a solution of 144 parts of ferrous sulfate heptahydrate ($FeSO_4.7H_2O$) in 1000 parts of water to 32.0 parts of sodium pyrophosphate decahydrate ($Na_4P_2O_7.10H_2O$) dissolved in 1400 parts of water. When the addition of the ferrous sulfate was completed, the resulting suspension was centrifuged under an inert atmosphere until the ferrous pyrophosphate separated out, the clear supernatant liquid then being decanted and the ferrous pyrophosphate then being resuspended in a sufficient amount of fresh water so that 10 parts of the activator suspension was equivalent in iron content to 0.36 part of ferrous sulfate heptahydrate. This activator was stored under an atmosphere of nitrogen at room temperature and was cooled to about 0° C. immediately prior to using.

The potassium salt of dehydrogenated rosin which was employed as an emulsifier was prepared by dissolving 4.52 parts of dehydrogenated rosin in 46.2 parts of methanol in the reaction vessel in which the polymerization reaction was ultimately effected. To this methanol solution of dehydrogenated rosin was added the chemically equivalent amount of 0.5 N aqueous potassium hydroxide. The potassium hydroxide solution was followed by the balance of the 150 parts of water specified in the above recipe with the exception of about 10 parts which was reserved for the activator solution. Thus, the emulsifier was obtained in the desired concentration in suspension in a portion of the water-methanol anti-freeze medium. The dehydrogenated rosin employed was prepared by the dehydrogenation of a distilled N wood rosin (about 5% light ends and 8% residue removed) in the presence of a palladium-on-carbon catalyst. The product so obtained was characterized by an acid number of 161.

After the emulsifying agent had been prepared, the $a,a$-dimethylbenzyl hydroperoxide catalyst was dissolved in the balance (3.8 parts) of the methanol and the resultant solution charged to the reaction vessel. The monomers were then mixed with the mercaptan modifier with the volatile monomer in definite excess and this mixture added to the contents of the reaction vessel. The excess volatile monomer was permitted to vaporize at room temperature to sweep the air out of the reaction vessel. The pressure within the reaction vessel was then adjusted to 30 p. s. i. with nitrogen and the vessel cooled to 0° C., pressured to 30 p. s. i. with nitrogen and then agitated at a temperature of −15° C. for one hour. Ten parts of the previously described activator, which had been cooled to a temperature of about 0° C., was then added and the pressure within the reaction vessel was once more adjusted to 30 p. s. i. with nitrogen. This activator contained the balance of the water specified in the above recipe. After the activator was added, the reaction vessel was again agitated at a temperature of −15° C. for the duration of the reaction period. Samples of the contents of the reaction vessel were withdrawn 16½ hours, 22½ hours and 41 hours after the addition of the activator. By this means was obtained a known weight of the latex which had been formed after each reaction period. To each latex sample so obtained was added a small portion of 2% aqueous hydroquinone solution to prevent further polymerization from occurring. The latex samples were then dried to constant weight to determine the percentage conversion of the monomer to polymer. Corrections were made for the hydroquinone added and for the nonpolymer solids.

By this means, it was determined that 22% of the monomers had been converted to a rubberlike copolymeric product after 16.5 hours of reaction while 34% of the monomers had been so copolymerized after 22.5 hours and 63% of the monomers had been so copolymerized after 41 hours of reaction.

Example 2

Seventy-two parts of butadiene-1,3 and 28 parts of styrene were copolymerized in a manner similar to that described in Example 1. In this case, however, the emulsifying agent was prepared externally from the reaction vessel by heating 4.52 parts of dehydrogenated rosin with the equivalent amount of 2N potassium hydroxide until a paste soap was formed and then diluting the paste with hot water to form a clear hot soap solution containing the potassium salt of dehydrogenated rosin in 10% concentration. After this soap solution had cooled, 50 parts thereof was charged to the reaction vessel. This emulsifying agent was followed by the balance of the water, with the exception of 10 cc. which was reserved for the activator solution, and by 46.2 parts of methanol. From this point on the polymerization reaction was conducted in exactly the same manner as that described in Example 1. However, in this instance the dehydrogenated rosin from which the emulsifying agent was prepared was freed from neutral bodies by extracting an aqueous alcoholic solution of the sodium salt of the rosin with petroleum ether, and acidifying the extracted aqueous solution of the sodium salt of the rosin to recover the rosin. The rosin was characterized by an acid number of 180.

By this means, 24% of the monomers was converted to a rubbery copolymeric material after 16.5 hours of reaction while 37% of the monomers was so copolymerized after 22.5 hours of reaction and 59% of the monomers was so copolymerized after 41 hours of reaction.

Example 3

The same procedure as that described in Example 1 was again utilized. In this case, however, styrene was polymerized alone in the presence of 0.307 part of $\alpha,\alpha$-dimethyl-p-isopropylbenzyl hydroperoxide as a catalyst. By this means 54% of the monomers was copolymerized after 16.5 hours of reaction while 76% of the monomers was copolymerized after 22.5 hours of reaction.

The $\alpha,\alpha$-dimethyl-p-isopropylbenzyl hydroperoxide was prepared by the air oxidation of p-diisopropylbenzene and contained 95.5% of the hydroperoxide.

Example 4

The same procedure as that described in Example 1 was duplicated. In this case, however, 75 parts of butadiene-1,3 and 25 parts of methyl isopropenyl ketone were copolymerized. By this means 38% of the monomers was copolymerized after 16.5 hours of reaction while 52% of the monomers was copolymerized after 22.5 hours of reaction.

Example 5

Seventy-five parts of butadiene-1,3 and 25 parts of acrylonitrile were copolymerized in a manner similar to that described in Example 1. In this case, however, the emulsifying agent was prepared by dissolving 3.01 parts of the dehydrogenated rosin described in Example 1 and 1.40 parts of lauric acid in 46.2 parts of the methanol portion of the antifreeze medium and neutralizing the solution so formed with 0.5 N-aqueous potassium hydroxide. Also in this case 0.256 part $\alpha,\alpha$-dimethyl-p-methylbenzyl hydroperoxide was utilized as a catalyst. This hydroperoxide was prepared by the air oxidation of p-cymene and contained 85.2% of the hydroperoxide.

By this means 63% of the monomers was copolymerized after 16.5 hours of reaction while 73% of the monomers was copolymerized after 22.5 hours of reaction.

Example 6

Seventy-five parts of butadiene-1,3 and 25 parts of methyl isopropenyl ketone were copolymerized in a manner similar to that described in Example 3. In this case, however, the activator was prepared by dissolving 12 parts of potassium pyrophosphate ($K_4P_2O_7$) in 300 parts of water and then adding dropwise in an inert atmosphere and with vigorous agitation a solution of 14.4 parts of ferrous sulfate heptahydrate ($FeSO_4.7H_2O$) in 93 parts of water. The activator so prepared was stored under nitrogen and placed in an ice chest at 0° C. until utilized.

Likewise in this case 0.307 part of $\alpha,\alpha$-dimethyl-p-isopropylbenzyl hydroperoxide was utilized as a catalyst. This $\alpha,\alpha$-dimethyl-p-isopropylbenzyl hydroperoxide was prepared by the air oxidation of p-diisopropylbenzene and contained 95% of the hydroperoxide.

After 16.5 hours of reaction 10% of the monomers was copolymerized while after 41 hours of reaction 36% of the monomers was copolymerized.

The dehydrogenated rosin acid emulsifying agents with which this invention is concerned include the alkali metal salts of dehydrogenated rosin or of dehydroabietic acid and mixtures of these salts with fatty acid soaps. Relative to any of these emulsifying agents it is preferable to use the potassium salt. Dehydrogenated rosin is also known as disproportionated rosin. The dehydrogenated rosin from which these emulsifying agents are formulated may be prepared by contacting gum or wood rosin or rosin-containing materials at an elevated temperature with an active dehydrogenation catalyst in the absence of added hydrogen. Catalysts such as palladium, platinum, nickel, copper chromite, etc. are suitable. The catalyst may be supported on a carrier, such as granular alumina, fibrous asbestos, or activated charcoal. Dehydrogenation or disproportionation with a palladium catalyst, for example, may be conducted either by a batchwise or continuous procedure. Thus, the rosin may be agitated with about 5 to about 20 per cent by weight of a palladium catalyst supported on activated carbon (1 to 2% palladium) at about 150° C. to about 300° C. for about 1 to about 5 hours. In the continuous process, the molten rosin flows over the supported palladium catalyst at a temperature within the range of about 225° to about 300° C. to provide a contact time of about ¼ hour to about 1 hour.

It often is advantageous to refine the whole rosin prior to its dehydrogenation or disproportionation, and the same is true as applied to the whole dehydrogenated or disproportionated product. Prior to its dehydrogenation or disproportionation the rosin may be refined by crystallization, by means of a selective solvent such as furfural or phenol, or by an absorbent earth.

With absorbent earths, such as fuller's earth or Percol, Percol being a special grade of bentonite which has been treated with sulfuric acid, the rosin may be refined by contacting a gasoline solution of the rosin with the earth, either batchwise or by passing the solution continuously through a column packed with the absorbent. The rosin solution is kept under an atmosphere of carbon dioxide or other inert gas throughout the refining procedure, and, after being filtered, is distilled to remove the solvent. The color of the rosin is improved by this procedure, and, after dehydrogenation or disproportionation, the product gives improved yields of vinyl polymerizates when used in accordance with this invention.

The whole dehydrogenated or disproportioned rosin also may be refined, as by distillation, heat treatment, alkali extraction, precipitation, etc. The heat treatment of dehydrogenated or disproportionated rosin may be carried out either in vacuum or in the presence of an inert gas, such as nitrogen or carbon dioxide, by heating the rosin material at a temperature between about 220° C. and about 270° C. for about 2 to about 15 hours. Utilizing vacuum, the temperature preferably is between about 220° C. and about 240° C., while in the case of an inert atmosphere it is between about 240° C. and about 260° C. The heat treatment may be combined with the dehydrogenation or disproportionation reaction by correlation of the desirable conditions for each process. By utilizing a heat treatment, the activity of the dehydrogenated or disproportionated rosin, when used in the form of its alkali metal salts as an emulsifier for vinyl polymerizations, is increased.

In refining dehydrogenated or disproportionated rosin by means of an alkaline extraction the rosin is dissolved in a suitable solvent, such as gasoline, and the resulting solution agitated vigorously with an aqueous alkali, such as sodium hydroxide, resulting in the formation of an emulsion stable at room temperature. The concentration of the alkali should not be above 4% and the extraction is carried out only once. Cooling the emulsion causes it to break into two layers, and from the aqueous layer is obtained dehydrogenated or disproportionated rosin acids in 95% yield based on the total acids (88% based on the total rosin treated) and having an acid number of 185–186. The acids, in the form of their alkali metal salts, give high yields in the emulsion polymerization of vinyl compounds.

Similar to the above procedure is a refining method which involves precipitation of the alkali metal or ammonium salts of dehydrogenated or disproportionated rosin. The rosin is dissolved in acetone, ethanol, isopropanol, or petroleum ether and the resulting solution treated with an alcohol solution of an alkali, such as sodium hydroxide. The use of isopropanol as the solvent and alcoholic sodium hydroxide as the alkali is preferable. The sodium salts of the dehydrogenated or disproportionated rosin acids precipitate immediately and are separated from the solution by filtration. The product is a uniform, very white, fairly dense powder which is useful as the emulsifying agent in accordance with this invention.

Another refining procedure applicable to the rosin prior to its dehydrogenation or disproportionation and also to the dehydrogenated or disproportionated product involves the precipitation of the rosin acids as the insoluble salts of certain organic amines, namely, hydroaromatic amines having at least one fully-saturated cyclic nucleus, aliphatic amines, aliphatic hydroxyamines and polyalkyl polyamines. The rosin material is dissolved in a suitable solvent such as acetone, isopropanol, Hi-Flash naphtha or gasoline, and the resulting solution is treated with organic amines such as cyclohexylamine, tetraethylene pentamine, 2-amino-2-methyl-1-propanol and diethylamine. The amine salts precipitate at once and are separated from the solution by filtration or centrifugation. Decomposition of the amine salts with heat or acid regenerates the free acids.

As previously indicated, the dehydrogenated rosin soaps may be utilized in conjunction with fatty acid soaps as emulsifying agents in the process of this invention. Thus, emulsifying agents containing up to 50% fatty acid soaps by weight may be utilized. A preferable range of concentration of fatty acid soaps is from about 10% to about 30% of the weight of the emulsifying agent. It is preferable that the fatty acid soaps employed in this invention be prepared from long-chain fatty acids which have from about 12 to about 18 carbon atoms in the molecule. A readily available source of such a mixture of fatty acids and rosin acids is tall oil. Tall oil is a by-product from the manufacture of paper pulp by the digestion of wood with alkaline liquors such as alkaline solutions of sodium sulfide. Crude tall oil consists of a mixture of rosin and fatty acids in roughly equal proportions in conjunction with minor amounts of neutral, unsaponifiable materials consisting primarily of plant sterols.

Tall oil may generally be dehydrogenated by the same processes as those previously described for the dehydrogenation of rosin. It is often advantageous to refine the tall oil prior to dehydrogenation. Various methods such as those previously described for the refining of rosin are satisfactory and yield products which are substantially lighter in color that the crude tall oil and which are more nearly odorless. Such refined tall oils may or may not differ greatly in composition from the crude material depending upon the conditions used. Distillation, for example, may be carried out in such a manner that it is possible to separate a fraction consisting almost exclusively of fatty acids and other fractions consisting predominantly of rosin acids. For utilization in the preparation of the emulsifying agents of this invention, however, it is usually desirable that tall oil be distilled to effect separation only of certain high-boiling constituents which are normally present and which exert inhibitory effects on both the dehydrogenation and polymerization processes. By this procedure the ratio of rosin acids to fatty acids remains essentially unchanged. Fractionation into the substantially pure fatty acid and rosin acid constituents by such distillation is unnecessary. The distillation should be carried out at reduced pressure, for example, from about 0.5 to about 25 mm. of mercury. The distillation temperatures which are operable within these pressure ranges will vary from about 150° C. to about 300° C.

Although those materials in tall oil which exhibit an inhibitory effect upon polymerization reactions can be at least partially removed by distillation or other refining procedures, it is preferable to remove them by pretreating the tall oil with a spent catalyst resulting from previous tall oil dehydrogenations. Spent palladium and nickel catalysts are particularly useful in such a treatment and the refined tall oil can then be dehydrogenated more readily than the crude product. The pretreatment with spent catalysts may be carried out under the same conditions as those used in the dehydrogenation step.

The dehydrogenated rosin, dehydroabietic acid and mixtures of these materials with fatty acids may be neutralized with basic compounds of the alkali metals such as hydroxides and carbonates of sodium and potassium to produce the emulsifying agents of this invention. These emulsifying agents may be prepared either in situ in the reaction vessel in which the polymerization is effected or externally therefrom. In any event, it is preferable that the emulsifying agent be admixed with the other reactants in the form of a solution or suspension in a portion of the antifreeze medium in which the polymerization is carried out. These emulsifying agents are preferably prepared by adding an aqueous solution of the alkali metal compound utilized to a solution of the dehydrogenated rosin acid material in a water-soluble organic compound, such as methanol, which may constitute a portion of the antifreeze medium in which the emulsion polymerization reaction is effected. However, the emulsifying agent may be prepared by reacting an aqueous solution of the alkali metal compound with the dehydrogenated rosin acid material to form an aqueous paste containing from about 50% to about 80% solids. This paste is preferably diluted, prior to admixture with the other ingredients of the reaction mixture, with a water-soluble organic compound which may constitute a portion of the antifreeze medium. If desired, however, the paste may be diluted with hot water to a concentration of about 10% by weight thus forming a clear hot soap solution. This solution should be cooled prior to admixture with the other ingredients and diluted with a portion of the antifreeze medium employed. If desired, the alkali metal salts of the dehydrogenated rosin acid material may, of course, be mixed with preformed fatty acid soaps to produce suitable emulsifying agents for use in the process of this invention.

Regardless of the method by which the emulsifying agent is prepared, it is desirable that the dehydrogenated rosin or dehydrogenated rosin acids or mixtures thereof with fatty acids which are employed be reacted with about the chemically equivalent amount of basic alkali metal compound. That is, it is desirable that the emulsifying agent constitute an essentially neutral product containing no substantial excess of either alkali or dehydrogenated rosin acid or fatty acid.

The emulsifying agents hereinbefore described may be employed in an amount equivalent to from about 0.5% to about 5% based on the total emulsion polymerization reaction mixture. A preferred range on this basis is from about 1% to about 2% of the weight of the reaction mixture. The concentration of the emulsifying agent in the aqueous phase may be from about 1% to about 5%, preferably from about 2% to about 3%. Based on the weight of the monomers originally present, the emulsifying agent may be utilized in an amount equivalent to from about 1.5% to 15% thereof and preferably in an amount equivalent to from about 4% to about 6% of the weight thereof.

The utilization of dehydrogenated rosin acid soaps as emulsifying agents in the polymerization of vinyl compounds is desirable in that the polymers thereby produced are characterized by superior physical properties, particularly in the case of rubbery polymers. These dehydrogenated rosin soap emulsifying agents are particularly desirable in low temperature emulsion polymerization reactions for the reason that these emulsifying agents reduce the tendency of the reaction mixture to gel as the temperature is lowered. Furthermore, these unique and desirable advantages obtain when the dehydrogenated rosin soaps are employed in conjunction with fatty acid soaps as is the case, for example, when the emulsifying agents are prepared from dehydrogenated tall oil.

The activators which are operable in the process of this invention comprise those electromotive couples having a standard oxidation-reduction potential between about $-1.0$ and about $-0.3$ volt, preferably between about $-0.8$ and about $-0.5$ volt. Such activators should be capable of reducing the $a,a$-dialkylarylmethyl hydroperoxide catalyst to a corresponding aromatic ketone in better than about 25% yield, for example, $a,a$-dimethylbenzyl hydroperoxide to acetophenone, in from about 0.25 hour to about 50 hours. Preferable are those electromotive couples containing a metallic reducing agent, such as the ferrous ($Fe^{++}$) ion, which forms a couple in the reaction mixture with an analogous material of higher oxidation state, such as the ferric ($Fe^{+++}$) ion. Thus, suitable activators for use in this invention may be prepared by adding an aqueous solution of ferrous sulfate heptahydrate ($FeSO_4 \cdot 7H_2O$) with agitation in an inert atmosphere to an aqueous solution of sodium pyrophosphate decahydrate ($Na_4P_2O_7 \cdot 10H_2O$). When the addition of the ferrous sulfate is completed, the ferrous pyrophosphate activator formed may be washed, for example, by centrifuging the reaction mixture to collect the ferrous pyrophosphate, decanting the supernatant liquid, and resuspending the ferrous pyrophosphate in pure distilled water. The ferrous pyrophosphate should be maintained under an inert atmosphere to prevent the air oxidation thereof and may be cooled to a temperature of about 0° C. prior to incorporation into the low temperature emulsion polymerization system with which this invention is concerned.

Suitable activators may be prepared in like manner from potassium pyrophosphate. The activators so prepared are advantageous in that the ferrous pyrophosphate formed may be utilized without the washing which is desirable in the case of a similar activator prepared from sodium pyrophosphate. Thus, the crude reaction mixture resultant from the addition of the ferrous sulfate solution to the potassium pyrophosphate solution may be employed. However, the activator prepared in this manner is subject to rather rapid deterioration at room temperature, and, accordingly should be stored at a temperature of about 0° C.

In so far as the preparation of ferrous pyrophosphate activators is concerned, the pyrophosphate compound and the ferrous salt utilized should be employed in such proportions that there is present in the reaction mixture in which the activator is formed from about 0.3 to about 2.5 chemical equivalents of the pyrophosphate for each chemical equivalent of the ferrous salt. A preferable range is from about 0.8 to about 2.0 chemical equivalents of pyrophosphate per chemical equivalent of ferrous salt. Particularly desirable is the presence of about 1.4 chemical equivalents of pyrophosphate for each chemical equivalent of ferrous salt. Soluble ferrous salts other than ferrous sulfate, such as for example ferrous chloride, may, of course, be utilized in the preparation of the ferrous activators which are operable in the process of this invention. Likewise, similar salts of analogous metals may be employed. It is necessary, of course, that the metallic ion component of these salts be in a reduced oxidation state. Furthermore, the ferrous and analogous metallic ions derived from these salts may be complexed with anions other than the pyrophosphate ion to form operable activators. For example, citrate ions may be so utilized.

The activator may be used in such an amount that there is provided from about 0.1 to about 3.0 electrons for each hydroperoxy radical. A preferable range for freshly-prepared activators is from about 0.8 to about 1.0 electron per hydroperoxy radical, and that for activators aged at room temperature or by heating for a short time at elevated temperatures is from about 0.8 to about 2.0 electrons per hydroperoxy radical.

The catalysts which are operable in the polymerization process of this invention have been illustrated in the examples by $a,a$-dimethylbenzyl, $a,a$-dimethyl-p-methylbenzyl and $a,a$-dimethyl-p-isopropylbenzyl hydroperoxides. Such hydroperoxides are generally known as $a,a$-dialkylarylmethyl hydroperoxides, and they may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agent. A preferred method of preparing these hydroperoxides involves the liquid phase oxidation of the alkyl-substituted aromatic organic compounds having the above structural formula by passing an oxygen-containing gas through the compounds at a temperature between about 25° C. and about 95° C. in the presence of an aqueous alkali. The concentration of the aqueous alkali may be between about 1% and about 35% although it is preferable to use concentrations of about 2% to about 8%. Vigorous agitation is desirable during the oxidation reaction.

As illustrative of the alkyl-substituted aromatic organic compounds which may be oxidized, p-cymene, cumene, and diisopropylbenzene may be mentioned. These compounds lead to $\alpha,\alpha$-dimethyl-p-methylbenzyl, $\alpha,\alpha$-dimethylbenzyl, and $\alpha,\alpha$-dimethyl-p-isopropylbenzyl hydroperoxides, respectively. Also, in the case of diisopropylbenzene, $a,a,a',a'$-tetramethyl-p-xylylene dihydroperoxide may be formed. These compounds also may be named as aryl(dialkyl)-methyl hydroperoxides; for example, $\alpha,\alpha$-dimethylbenzyl hydroperoxide may be designated as phenyl(dimethyl)methyl hydroperoxide. The aryl and substituted aryl groups need not be derived from benzene, as is the case in the aforementioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, tertiary butyl, and the like, the same alkyl groups also being representative of $R_1$ and $R_2$ in the structural formula. $R_1$ and $R_2$ may be either the same or different.

The amount of hydroperoxide which may be used in accordance with this invention may be between about 0.5% and about 20% based on the amount of solid emulsifying agent used. The preferable amount of hydroperoxide on this basis, however, is from about 2% to about 6%. Based on the monomers, the amount of hydroperoxide may be from about 0.001 to about 5.0%, a desirable range being from about 0.02 to about 1.5%, and the preferable amount of hydroperoxide on this basis being from about 0.1 to about 0.6%.

Aqueous solutions of water-soluble organic compounds of low freezing point may be employed as antifreeze media in the process of this invention. Thus, water solutions of the lower alkanols, such as methanol and ethanol, may be utilized. Also operable are water solutions of other alcohols, including polyfunctional alcohols such as glycerol or ethylene glycol. In fact, at quite low temperatures, better reaction rates are often obtained by the utilization as antifreeze agents of such polyfunctional molecules. If desired, water solutions of nonalcoholc compounds such as acetone and methyl acetate may be employed. In any particular instance, those skilled in the art will be able to select or formulate a reaction medium, the freezing point of which is below the temperature at which it is desired to effect a particular polymerization reaction. Such reactions may be readily carried out at temperatures of −15° C. in a medium consisting of 3 parts of water and 1 part methanol. As previously indicated, it is advantageous prior to admixing the emulsifying agent with the other ingredients of the polymerization system to form a solution or suspension thereof in a portion of the antifreeze medium.

$\alpha$-Hydroxy carbonyl compounds or compounds which react as $\alpha$-hydroxy carbonyl compounds may be added to the other ingredients of the reaction mixture in the process of this invention. Thus, such compounds as fructose, glucose, lactose, sorbose, acetylacetone, ascorbic acid, benzoin, acetoin, propionoin, butyroin, isobutyroin, pivaloin and the like may be utilized. In general, those aldehydes and ketones containing a hydroxyl group on an adjacent carbon atom in an alkyl chain and having thereby in common the structural group

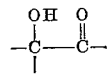

are operable in this invention. The preferable $\alpha$-hydroxy aldehydes and ketones are those compounds which are known as reducing sugars.

Exemplary of the reducing sugars which may be used in accordance with this invention are the monosaccharides, including aldotrioses such as glycerose; ketotrioses such as dioxyacetone; aldotetroses such as erythrose and threose; ketotetroses such as erythrulose; aldopentoses such as arabinose, xylose, lyxose, and ribose; ketopentoses such as araboketose and xylokotose; aldohexoses such as glucose, galactose, mannose, gulose, idose, talose, allose and the like; ketohexoses such as fructose or levulose, sorbose and the like; and other reducing sugars including the disaccharides and trisaccharides such as maltose, lactose, and mannotriose. Also operable is the equimolecular mixture of fructose and glucose obtained through the hydrolysis of sucrose and known as invert sugar. As illustrative of the $\alpha$-hydroxycarbonyl compounds in general, the amount of reducing sugar employed may vary from about 0.01 to about 6% of the weight of the monomers. A preferable range on this basis is from about 0.1 to about 3%. Particularly appropriate is that quantity of sugar equivalent to about 0.5% of the weight of the monomer.

It is desirable, particularly in the polymerization of those compounds leading to synthetic rubberlike materials, that there be included in the polymerization reaction mixture a modifying agent. The conventional modifying agents may be used in the process of this invention. Thus, the mercaptans normally so employed may be utilized, and the amount may be that usually used, for example, in the preparation of synthetic rubbers. It is desirable, however, that the mercaptan modifier be tertiary for the reason that improved modification of the rubber is thereby obtained. Primary mercaptans may, however, be employed if desired. It is of significance, however, that by the process of this invention there may be produced benzene-soluble, high viscosity polymers of conjugated butadienes and of copolymers of conjugated butadienes containing about 50% or more of the butadiene without the utilization of a modifier. This result is novel since omission of the modifier in the polymerization of such materials has in the past resulted in formation of insoluble polymers and copolymers. The unmodified conjugated butadiene polymers and copolymers of this invention are valuable as adhesives, paper-treating agents and the like.

The emulsion polymerization of the vinyl, vinylene and vinylidene compounds may be effected in accordance with this invention at temperatures up to about 0° C. Temperatures as low as —70° C. may be employed if desired. The preferable temperature range is from about —30° to about —5° C.

If desired, small quantities of inorganic salts such as potassium sulfate may be added to the reaction mixture to reduce the viscosity of the latices of the polymers obtained. The utilization of large quantities of such salts, however, adversely affects the rate and extent of polymerization. A preferable range of concentration of such salts is from about 0.1 to about 0.5% of the weight of the monomers. Except as otherwise indicated, the conventional emulsion polymerization techniques, concentrations of reactants and reaction conditions may be utilized in practicing the process of this invention.

Compounds which may be advantageously polymerized in antifreeze media by the process of this invention include the conjugated butadienes such as butadiene-1,3, isoprene, 2,3-dimethyl butadiene-1,3, chloroprene, piperylene, monomer mixtures of two or more of these conjugated butadienes such as a mixture of butadiene-1,3 and 2,3-dimethyl butadiene-1,3 and monomer mixtures of one or more of these conjugated butadienes with vinyl compounds such as styrene, p-chlorostyrene, p-methoxystyrene, vinyl naphthalene, acrylic acid, methacrylonitrile, methyl methacrylate, methyl acrylate, methyl vinyl ketone, methyl isopropenyl ketone, methyl vinyl ether and the like. The process of this invention is particularly applicable to the preparation of the copolymers of butadiene and styrene or acrylonitrile, isoprene and styrene or acrylonitrile, and other rubberlike copolymers as well as in the preparation of polymers such as polyvinyl chloride, polyvinyl acetate, polystyrene, polymethylmethacrylate, polyvinylidene chloride, polyvinyl pyridine, and the various other addition polymers which may be prepared by the emulsion technique.

It has been recognized by the art that superior rubber-like materials might be prepared from vinyl, vinylene and vinylidene compounds by emulsion polymerization at low temperatures. Heretofore, however, such processes have been found to entail unduly long reaction periods and to result in low yields of polymeric materials. The process of this invention, utilizing as emulsifying agents the alkali metal salts of dehydrogenated rosin acids, permits the attainment of satisfactory yields of superior polymeric materials in reasonable lengths of time. The combination of the particular catalysts, namely, the $\alpha,\alpha$-dialkylarylmethyl hydroperoxides, with the particular activators and emulsifying agents results in good yields of polymers from low temperature polymerizations, and particularly in the case of the rubberlike polymers, such as those derived from the copolymerization of butadiene and styrene, imparts desirable physical properties to the polymers.

What I claim and desire to protect by Letters Patent is:

1. In the process which comprises polymerizing an organic compound containing the $CH_2=CH<$ group at a temperature between about —5° C. and —70° C. in aqueous emulsion in the presence of a water-soluble organic compound of low freezing point as antifreeze agent, an $\alpha,\alpha$-dialkylarylmethyl hydroperoxide as catalyst, between about 0.5% and about 5% of an alkali metal salt of a dehydrogenated rosin acid as emulsifying agent, and a metal electromotive couple having a standard oxidation potential between about —1.0 and about —0.3 volt as activator, the improvement which comprises using an alkali metal salt of a dehydrogenated rosin acid which is produced by saponifying said dehydrogenated rosin acid in an aqueous solution of the said antifreeze agent.

2. In the process which comprises polymerizing an organic compound containing a $CH_2=CH<$ group at a temperature between about —5° C. and —70° C. in aqueous emulsion in the presence of a water-soluble organic compound of low freezing point as antifreeze agent, an $\alpha,\alpha$-dialkylarylmethyl hydroperoxide as catalyst, between about 0.5% and about 5% of an alkali metal salt of a dehydrogenated rosin acid as emulsifying agent, and a metal electromotive couple having a standard oxidation potential between about —0.8 and about —0.5 volt as activator, the improvement which comprises using an alkali metal salt of a dehydrogenated rosin acid which is produced by saponifying said dehydrogenated rosin acid in an aqueous solution of the said antifreeze agent.

3. In the process which comprises polymerizing butadiene-1,3 at a temperature between about —5° C. and —70° C. in aqueous emulsion in the presence of a water-soluble organic compound of low freezing point as antifreeze agent, an $\alpha,\alpha$-dialkylarylmethyl hydroperoxide as catalyst, between about 0.5% and about 5% of an alkali metal salt of a dehydrogenated rosin acid as emulsifying agent, and a metal electromotive couple having a standard oxidation potential between about —1.0 and about —0.3 volt as activator, the improvement which comprises using an alkali metal salt of a dehydrogenated rosin acid which is produced by saponifying said dehydrogenated rosin acid in an aqueous solution of the said antifreeze agent.

4. In the process which comprises copolymerizing a mixture of butadiene-1,3 and styrene at a temperature between about —5° C. and —70° C. in aqueous emulsion in the presence of a water-soluble organic compound of low freezing point as antifreeze agent, an $\alpha,\alpha$-dialkylarylmethyl hydroperoxide as catalyst, between about 0.5% and about 5% of an alkali metal salt of a dehydrogenated rosin acid as emulsifying agent, and a metal electromotive couple having a standard oxidation potential between about —1.0 and —0.3 volt as activator, the improvement which comprises using an alkali metal salt of a dehydrogenated rosin acid which is produced by saponifying said dehydrogenated rosin acid in an aqueous solution of the said antifreeze agent.

5. In the process which comprises copolymerizing a mixture of butadiene-1,3 and acrylonitrile at a temperature between about —5° C. and —70° C. in aqueous emulsion in the presence of a water-soluble organic compound of low freezing point as antifreeze agent, an $\alpha,\alpha$-dialkylarylmethyl hydroperoxide as catalyst, between about 0.5% and about 5% of an alkali metal salt of a dehydrogenated rosin acid as emulsifying agent, and a metal electromotive couple having a standard oxidation potential between about —1.0 and about —0.3 volt as activator, the improvement which comprises using an alkali metal salt of a dehydrogenated rosin acid which is produced by saponifying said dehydrogenated rosin acid in an aqueous solution of the said antifreeze agent.

6. In the process which comprises polymerizing an organic compound containing a $CH_2=CH<$ group at a temperature between about $-5°$ C. and $-70°$ C. in aqueous emulsion in the presence of a water-soluble organic compound of low freezing point as antifreeze agent, an $a,a$-dimethylbenzyl hydroperoxide as catalyst, between about 0.5% and about 5% of an alkali metal salt of a dehydrogenated rosin acid as emulsifying agent, and a metal electromotive couple having a standard oxidation potential between about $-1.0$ and about $-0.3$ volt as activator, the improvement which comprises using an alkali metal salt of a dehydrogenated rosin acid which is produced by saponifying said dehydrogenated rosin acid in an aqueous solution of the said antifreeze agent.

7. In the process which comprises polymerizing an organic compound containing the $CH_2=CH<$ group at a temperature between about $-5°$ C. and $-70°$ C. in aqueous emulsion in the presence of a water-soluble organic compound of low freezing point as antifreeze agent, an $a,a$-dimethyl-p-methylbenzyl hydroperoxide as catalyst, between about 0.5% and about 5% of an alkali metal salt of a dehydrogenated rosin acid as emulsifying agent, and a metal electromotive couple having a standard oxidation potential between about $-1.0$ and about $-0.3$ volt as activator, the improvement which comprises using an alkali metal salt of a dehydrogenated rosin acid which is produced by saponifying said dehydrogenated rosin acid in an aqueous solution of the said antifreeze agent.

8. In the process which comprises polymerizing an organic compound containing the $CH_2=CH<$ group at a temperature between about $-5°$ C. and $-70°$ C. in aqueous emulsion in the presence of a water-soluble organic compound of low freezing point as antifreeze agent, an $a,a$-dimethyl-p-isopropylbenzyl hydroperoxide as catalyst, between about 0.5% and about 5% of an alkali metal salt of a dehydrogenated rosin acid as emulsifying agent, and a metal electromotive couple having a standard oxidation potential between about $-1.0$ and about $-0.3$ volt as activator, the improvement which comprises using an alkali metal salt of a dehydrogenated rosin acid which is produced by saponifying said dehydrogenated rosin acid in an aqueous solution of the said antifreeze agent.

9. In the process which comprises copolymerizing a mixture of butadiene-1,3 and styrene at a temperature between about $-5°$ C. and $-70°$ C. in aqueous emulsion in the presence of a water-soluble organic compound of low freezing point as antifreeze agent, an $a,a$-dimethyl-p-isopropylbenzyl hydroperoxide as catalyst, between about 0.5% and about 5% of an alkali metal salt of a dehydrogenated rosin as emulsifying agent, and a metal electromotive couple having a standard oxidation potential between about $-0.8$ and $-0.5$ volt as activator, the improvement which comprises using an alkali metal salt of a dehydrogenated rosin acid which is produced by saponifying said dehydrogenated rosin acid in an aqueous solution of the said antifreeze agent.

EDWIN J. VANDENBERG.

References Cited in the file of this patent

UNITED STATES PATENTS

| Number | Name | Date |
|---|---|---|
| 2,535,557 | Walton | Dec. 26, 1950 |
| 2,546,220 | Fryling et al. | Mar. 27, 1951 |
| 2,581,402 | Fryling | Jan. 8, 1952 |

OTHER REFERENCES

Shearon, Jr., Ind. & Eng. Chem., May 1948, pp. 769–777.

Vandenberg et al., Ind. & Eng. Chem., May 1948, pp. 932–937.